Patented Aug. 12, 1924.

1,504,986

UNITED STATES PATENT OFFICE.

WALTER O. SNELLING, OF ALLENTOWN, PENNSYLVANIA, ASSIGNOR TO TROJAN POWDER COMPANY, OF NEW YORK, N. Y., A CORPORATION OF NEW YORK.

PROCESS OF TREATING NITRATED CARBOHYDRATES.

No Drawing. Application filed March 21, 1921. Serial No. 454,207.

*To all whom it may concern:*

Be it known that I, WALTER O. SNELLING, a citizen of the United States, and resident of Allentown, Lehigh County, Pennsylvania, have invented certain Improvements in Processes of Treating Nitrated Carbohydrates (the same being in part a continuation of my application Serial No. 268,498, filed December 27, 1918), of which the following is a specification.

My invention relates to the treatment of organic nitrates, more particularly nitrated carbohydrates, and its object is to provide a process for increasing the stability of said nitrated bodies.

In the nitration of carbohydrates such as starch, dextrine, dextrose, and like materials, the nitrated body, instead of being a chemically homogeneous product, comprises a number of nitric acid esters of different chemical configuration, some of which are quite stable, while others are less so. This is due to the fact that the carbohydrate itself is made up of bodies of differing molecular configuration, some of which upon nitration give stable nitric acid esters, while others give unstable nitric acid esters. The nitrated carbohydrate therefore represents a heterogeneous body comprising unstable nitric acid esters mixed with stable nitric acid esters. While in general the percentage of unstable nitric acid esters in the nitrated product is quite small, in many cases as small as one per cent, and in some perhaps one-tenth of one per cent, of the entire nitrated product, the presence of this small amount of unstable ester has the effect of reducing the whole mass of the material almost to its own degree of instability. The reason for this is that when a nitric acid ester decomposes, oxides of nitrogen are liberated, and act as a catalyst in breaking down other nitric acid esters, so that the decomposition of the stable esters is quickly brought about.

In the case of nitro-cellulose, certain methods for the preliminary purification of the cellulose have been worked out for eliminating prior to nitration, the compounds which if permitted to remain would give unstable nitrates, but such preliminary purification methods have proved unsuccessful in the treatment of other carbohydrates. While in the treatment of such carbohydrates as starch, dextrine and the sugars, the amount of the bodies present which give unstable esters on nitration can be considerably reduced by preliminary purification, no purification treatment has been found which will cause the nitrated bodies to consist solely of molecules of a single kind, or to be wholly or substantially free from unstable nitric acid esters.

By my process as hereinafter set forth, I treat the nitrated carbohydrate, such for example as nitrated starch, dextrine or the sugars, and which contains a percentage of unstable ester, with a re-agent of properly controlled strength, having the effect of decomposing the unstable esters without affecting the stable esters also present. Preferably I first reduce the unstable esters to a form in which they are soluble in the re-agent employed, then dissolve the degraded material in the solvent and then remove the solvent containing the dissolved degraded esters, thus freeing from them completely the stable esters.

The following is an illustration of my process, in its preferred form, as applied to the treatment of nitrostarch.

I nitrate and wash starch in the customary way, preferably washing until the acidity of the nitrostarch is reduced to less than one per cent, determined as sulfuric acid. I then add fresh water to the nitrated starch, so that for each volume of the wet nitrated starch there are approximately two volumes of water present. I then lead sulfur dioxide gas into the water, to the amount of from one to two per cent of the weight of the nitrostarch present.

The sulfur dioxide gas unites with the water to form sulfurous acid, having the formula $H_2SO_3$, the sulfurous acid being dissolved in the excess of water present. I next warm the batch, preferably by turning steam into the mixture while stirring or agitating in any suitable way. By directing jets of steam tangentially into the tub in which the material is being treated, the steam can be made to combine both the heating and stirring actions, but I find vigorous stirring to be of advantage. I continue to add steam until the temperature of the material under treatment has reached from 90 to 100 degrees C., and I maintain the batch at this temperature for from one to one and one-half hours. At the end of this period of treatment the nitrostarch is separated from the solution by filtration or other means, and the treated nitrostarch is then further washed and neutralized by the usual procedure.

I may use amounts of sulfur dioxide varying from one-tenth of one per cent, or less, to as much as five per cent of the weight of the nitrostarch treated, with satisfactory results, but I find that the use of sulfur dioxide to the extent of approximately one-half per cent to one per cent of the weight of the nitrostarch under treatment gives the desired stabilization under normal operating conditions, and I prefer to use approximately this concentration. I may use somewhat lower temperature than the 90 degrees to 100 degrees C. specified, providing a longer time of treatment is given, but the temperature should not in any case be less than 60 degrees C., and even at this temperature the time of treatment must be quite long to bring about suitable stabilization.

I may employ a solution of sodium thiosulfate as my reducing agent, in which case the preferred procedure is as follows:

To 100 kilos of the wet nitrostarch of approximately 13% nitration (containing approximately 60 kilos of nitrated starch and 40 kilos of water) I add 300 kilos of water in which has been dissolved 6 kilos of sodium thiosulfate.

The mix is stirred until the starch is thoroughly suspended in the thiosulfate solution. I then heat the suspension, while stirring continuously, until the mix has a temperature of 100 degrees C. When the temperature has reached 100 degrees C., I slowly add 3 kilos of concentrated sulfuric acid, preferably diluted with several times its weight of water to avoid excessive local heating when the sulfuric acid solution comes in contact with the hot water. I may add the entire 3 kilos of sulfuric acid at one time, but I prefer to add the sulfuric acid slowly during the entire stabilizing treatment. After maintaining my bath at a temperature of 100 degrees C. with continued stirring, for a period of one hour, I discontinue stirring, and either allow the material to stand quietly to allow the starch to settle, or I run the material onto a filter, and remove the liquor from the treated nitrostarch.

The stabilized nitrostarch is next washed, to remove any adhering acid solution, and is then ready for neutralization and drying in the customary way.

The sodium thiosulfate bath so prepared has the effect of very rapidly reducing and decomposing all unstable nitric acid esters which are present, but appears to have no effect whatever on stable esters.

For sulfuric acid, in the specific process last described, I may substitue other acids; for example, acetic acid appears to be quite as efficient as an acidifying means as is sulfuric acid. The latter, however, is preferred because of its cheapness and availability.

In employing sodium thiosulfate as the reducing agent, I may omit the acid and employ the sodium thiosulfate in neutral solution, or I may use sodium thiosulfate in alkaline solution. The desired reducing action may be thus obtained, but I prefer to employ the sodium thiosulfate in acid solution.

Numerous other reducing agents may be substituted for either of those already mentioned. I have had success with solutions of other sulfur compounds, such as alkali sulfites, bisulfites and sulfurous acid alone. With each of these sulfur compounds I obtain the desired result, to wit, the reduction, decomposition and dissolution of the unstable nitric acid esters, without affecting the stable nitric acid esters.

I may employ organic reducing agents, such as formic acid or oxalic acid, and I have also had success with ferrous salts such as ferrous sulfate and ferrous oxalate. When using such relatively weak reducing agents, however, it is necessary to employ a relatively longer period of heating, and a relatively higher temperature, or to employ the combined effect of these two. Although with relatively effective reducing agents, such as sulfur dioxide and sodium bisulfite, satisfactory results may be obtained at temperatures as low as 60 degrees C., and with periods of heating of from ten minutes to thirty minutes, with relatively weaker and less efficient reducing agents the temperature should be 80 degrees C. or higher, and the period of treatment should preferably be from thirty minutes to two or three hours.

I may also use several reducing agents in admixture. For example, a solution containing one per cent of sodium sulfite, one per cent of sodium thiosulfate and sufficient sulfuric acid to make the solution slightly acid, gives the same result as the treatment with a two per cent solution of sodium thiosulfate above specifically outlined.

In carrying out the process, the degree of concentration of the reducing agent, the temperature and time of heating are all capable of some variation. For example, with sodium thiosulfate I prefer to use a two per cent solution, with a heating period of one hour and a temperature of 100 degrees C., but a temperature as low as 60 degrees C. may be used with a proportionately longer period of treatment, or I may shorten the treating period by operating at temperatures somewhat above 100 degrees C. in an autoclave. So also if the strength of the reducing agent is somewhat decreased or increased, the heating period will require lengthening or shortening respectively. For each reducing agent suitable for my process there is a concentration and a temperature and period of heating which gives the most satisfactory results. For example, with oxalic acid I find that a two per cent solution kept at a temperature of 100 degrees C. for one-half hour is satisfactory. With sodium bisulfite in neutral or slightly acid solution, I may use a one per cent solution and a reducing period of one and one-half to two hours. With very powerful reducing agents, such as true hyposulfite obtained by the reduction of a sulfite by means of zinc, for example, a solution somewhat more dilute than two per cent is desirable, and with such materials I prefer to use a solution of one-half per cent to one per cent strength, a treating period of one hour, and a temperature of 70 degrees to 80 degrees C. The best concentration of the solution is dependent upon the reducing activity of the particular agent used, and in every case I so regulate the concentration, the temperature, and the period of heating, as to obtain the selective reduction desired,—that is to say, the reduction, decomposition and dissolving of the unstable nitric acid esters without affecting the stable esters.

In general, with any reducing agent, I prefer to use a solution of approximately one per cent to two per cent strength, a heating period of approximately one-half to two hours, and a temperature during the heating period of approximately 60 degrees to 100 degrees C. High concentrations of strong reducing agents must not be used, since in this case the selective action becomes lessened, and both stable and unstable nitric acid esters are reduced.

My invention is applicable generally to the nitric acid esters of carbohydrates, and particularly applicable to the nitric acid esters of starch, dextrine and the sugars, and so far as I am aware, I am the first to discover that the action of controlled reducing agents of low concentration is capable of decomposing unstable nitric acid esters of carbohydrates without at the same time injuring the stability of the stable nitric acid esters originally present. In the broader aspect of my invention, therefore, I do not wish to be limited to the specific reducing agents mentioned, nor to the details of the treatment outlined, as these are all capable of variation within limits, without departing from the spirit of my invention.

By my present invention I am able to take a sample of nitrostarch, for example, and so greatly increase its stability that it will withstand heating at a temperature of 100 degrees C. for several times the period over which the original product would stand such heating, even after the most careful washing and neutralization. Since doubling the time the material withstands the temperature of 100 degrees represents much more than a doubling of the stability, it will be seen that the present method of stabilization represents a great advance in the treatment of carbohydrate esters.

I do not claim as part of my invention the washing of organic nitrates with solutions of inactive salts such as the chlorides or acetates of lead or zinc, or the washing of organic nitrates with solutions of ferrous sulfate at room temperature, as such washing treatments do not have the effect described in this application, and do not bring about the selective reduction of unstable nitric acid esters, nor the solution and removal of such unstable nitric acid esters.

I claim:

1. The process which comprises subjecting a nitrated carbohydrate to the action of a reducing agent in weak solution at a temperature in excess of 60° C.

2. The process which comprises subjecting a nitrated carbohydrate to the action of a sulfur reducing agent in weak solution at a temperature in excess of 60° C.

3. The process which consists in subjecting a nitrated carbohydrate to the action of a reducing agent in weak solution at a temperature in excess of 60° C., and then separating the undissolved material from the solution.

4. The process which comprises subjecting a nitrated carbohydrate comprising ingredients of different degrees of stability to the action at a temperature in excess of 60° C. of a reducing agent in solution sufficiently dilute to prevent action upon the more stable ingredients of the mass while decomposing the ingredients of lesser stability.

5. The process which comprises subjecting a nitrated carbohydrate comprising ingredients of different degrees of stability to the action at a temperature in excess of 60° C. of a reducing agent in solution sufficiently dilute to prevent action upon the more stable ingredients of the mass while decomposing and dissolving the ingredients of lesser stability.

6. The method of eliminating unstable nitric acid esters present in nitrated carbohydrates, which consists in treating the nitrated body at a temperature in excess of 60° C. with a reducing agent in solution sufficiently weak to prevent action on the more stable ingredients of the mass while decomposing and dissolving the ingredients of lesser stability, and thereafter freeing the undissolved material from the liquid and material in solution.

7. The process which consists in subjecting a nitrated carbohydrate to the action of a sulfur reducing agent in weak solution at a temperature in excess of 60° C., and then separating the undissolved material from the solution.

8. The method of selectively reducing the unstable nitric acid esters present in nitrated carbohydrates, which comprises treating the nitrated body with a solution of a reducing agent at temperatures in excess of 60° C.

9. The method of selectively reducing the unstable nitric acid esters present in nitrated carbohydrates, which comprises treating the nitrated body with a solution of a sulfur reducing agent at temperatures in excess of 60° C.

10. The process which consists in acting upon a nitrated carbohydrate at a temperature in excess of 60° C. with a reducing agent of strength sufficient to reduce and decompose the more readily decomposible ingredients only, dissolving said decomposed material in said reagent, and then removing the solvent and material in solution.

11. The process of treating nitrated carbohydrates, which comprises acting at a temperature in excess of 60° C. upon unstable nitric acid esters present with a reducing agent capable of bringing such unstable nitric acid esters into solution, but inert with respect to the stable nitric acid esters present.

12. The process of treating nitrated carbohydrates, which consists in adding thereto a reducing agent of sufficient strength to decompose the unstable nitric acid esters without affecting the stable esters, bringing the temperature of the mixture in excess of 60° C., continuing the action of said agent upon said nitrated body until the constituents of said unstable esters are dissolved, and then removing the agent and material in solution.

13. The process of stabilizing nitrated carbohydrates, which consists in acting upon the nitrated body with a reducing agent in solution of such dilution as to reduce and decompose the more readily decomposible nitric acid esters only, continuing said treatment at a temperature in excess of 60° C. and for such period of time as may be required for the complete decomposition of said unstable esters and the dissolving of the products of decomposition, and then removing the resulting solution.

14. The process which comprises subjecting nitrostarch to the action of a reducing agent in weak solution at a temperature in excess of 60° C.

15. The process which comprises subjecting nitrostarch to the action of a sulfur reducing agent in weak solution at a temperature in excess of 60° C.

16. The process which consists in subjecting nitrostarch to the action of a reducing agent in weak solution at a temperature in excess of 60° C., and then separating the undissolved material from the solution.

17. The process which comprises subjecting nitrostarch comprising ingredients of different degrees of stability to the action at a temperature in excess of 60° C. of a reducing agent in solution sufficiently dilute to prevent action upon the more stable ingredients of the mass while decomposing the ingredients of lesser stability.

18. The process which comprises subjecting nitrostarch comprising ingredients of different degrees of stability to the action at a temperature in excess of 60° C. of a reducing agent in solution sufficiently dilute to prevent action upon the more stable ingredients of the mass while decomposing and dissolving the ingredients of lesser stability.

19. The method of eliminating unstable nitric acid esters present in nitrostarch, which consists in treating the nitrated body at a temperature in excess of 60° C. with a reducing agent in solution sufficiently weak to prevent action on the more stable ingredients of the mass while decomposing and dissolving the ingredients of lesser stability, and thereafter freeing the undissolved material from the liquid and material in solution.

20. The method of selectively reducing the unstable nitric acid esters present in nitrostarch, which comprises treating the nitrated body with a solution of a reducing agent.

21. The method of selectively reducing the unstable nitric acid esters present in nitrostarch, which comprises treating the nitrated body with a solution of a sulfur reducing agent.

22. The process of treating nitrostarch, which consists in subjecting the nitrated body to the action of a reducing agent in weak solution, thereby decomposing and dissolving the unstable nitric acid esters without affecting the more stable esters, and then separating the undissolved material from the solution.

23. The process of treating nitrostarch comprising ingredients of different degrees of stability, which consists in subjecting the mass to the action of a reducing agent in solution sufficiently dilute to prevent action upon the more stable ingredients of the mass while decomposing and dissolving the ingredients of lesser stability, and then freeing the undissolved material from the liquid and material in solution.

24. The process of treating nitrostarch, which consists in acting thereon with a reducing agent of strength sufficient to reduce and decompose the more readily decomposible ingredients only, dissolving said decomposed material in said reagent, and then removing the solvent and material in solution.

25. The process of treating nitrostarch, which comprises acting upon unstable nitric acid esters present with a reducing agent capable of bringing such unstable nitric acid esters into solution, but inert with respect to the stable nitric acid esters present.

26. The process of treating nitrostarch, which consists in adding thereto a reducing agent of sufficient strength to decompose the unstable nitric acid esters without affecting the stable esters, continuing the action of said agent upon said nitrated body until the constituents of said unstable esters are dissolved, and then removing the agent and material in solution.

27. The process of treating nitrostarch, which comprises acting upon unstable nitric acid esters present with a sulfur reducing agent capable of bringing such unstable nitric acid esters into solution, but inert with respect to the stable nitric acid esters present.

28. The process of treating nitrostarch, which consists in adding thereto a sulfur reducing agent of sufficient strength to decompose the unstable nitric acid esters without affecting the stable esters, continuing the action of said agent upon said nitrated body until the constituents of said unstable esters are dissolved, and then removing the agent and material in solution.

29. The process of treating nitrostarch, which consists in subjecting the nitrated body to the action of a sulfur reducing agent in weak solution, thereby decomposing and dissolving the unstable nitric acid esters without affecting the more stable esters, and then separating the undissolved material from the solution.

30. The process which comprises subjecting a nitrated carbohydrate in wet condition to the action of sulfur dioxide.

31. The process which comprises subjecting a nitrated carbohydrate to the action of sulfurous acid at a temperature in excess of 60° C.

32. The process of stabilizing nitrated carbohydrates which consists in acting thereon with a reducing agent in solution of approximately one per cent to two per cent concentration for a period of from one-half hour to two hours, at a temperature from 60 degrees C. to 100 degrees C., and then removing the agent and dissolved material from the undissolved nitro-carbohydrate.

33. The process of stabilizing nitrostarch and the like, which consists in acting thereon with a solution of a sulfur reducing agent of from one-half per cent to three per cent concentration at a temperature of approximately 100 degrees C. and for a period of from one-half hour to two hours, and then freeing the undissolved mass from the agent and material in solution.

34. The process of stabilizing nitrostarch and the like, which consists in acting thereon with a solution of sulfurous acid to decompose and dissolve unstable nitric acid esters present in the nitrostarch, and then removing the re-agent and material in solution.

35. The process of stabilizing nitrostarch, which consists in leading sulfur dioxide gas into a volume of water containing nitrostarch, heating the batch to a temperature of from 90 to 100 degrees C., maintaining the batch at said temperature for a period of from one to one and one half hours, and then removing the nitrostarch.

36. The process of stabilizing nitrostarch, which consists in leading into a volume of water containing nitrostarch, sulfur dioxide gas to the amount of five per cent or less by weight of the nitrostarch, heating the batch to a temperature of not less than approximately 60 degrees C., maintaining the batch at said temperature until the unstable nitric acid esters are decomposed and dissolved, and then separating the nitrostarch from the solution.

WALTER O. SNELLING.